United States Patent
Bucking

(10) Patent No.: US 9,835,172 B2
(45) Date of Patent: Dec. 5, 2017

(54) SUPPLEMENTAL AIR COOLING SYSTEM AND AIR PRESSURE OIL SEALING SYSTEM FOR ELECTRICAL TURBOCOMPOUND MACHINE

(71) Applicant: BorgWarner Inc., Auburn Hills, MI (US)

(72) Inventor: Michael Bucking, Asheville, NC (US)

(73) Assignee: BorgWarner Inc., Auburn Hills, MI (US)

( * ) Notice: Subject to any disclaimer, the term of this patent is extended or adjusted under 35 U.S.C. 154(b) by 386 days.

(21) Appl. No.: 14/441,997

(22) PCT Filed: Nov. 4, 2013

(86) PCT No.: PCT/US2013/068228
§ 371 (c)(1),
(2) Date: May 11, 2015

(87) PCT Pub. No.: WO2014/074433
PCT Pub. Date: May 15, 2014

(65) Prior Publication Data
US 2015/0285263 A1    Oct. 8, 2015

Related U.S. Application Data

(60) Provisional application No. 61/725,150, filed on Nov. 12, 2012.

(51) Int. Cl.
*F04D 29/58*    (2006.01)
*F01D 25/12*    (2006.01)
(Continued)

(52) U.S. Cl.
CPC ......... *F04D 29/5806* (2013.01); *F01D 25/12* (2013.01); *F02C 6/12* (2013.01);
(Continued)

(58) Field of Classification Search
None
See application file for complete search history.

(56) References Cited

U.S. PATENT DOCUMENTS 7,530,230 B2 *  5/2009  Shibui ................ F02B 37/04
                                                      290/52
2006/0225419 A1  10/2006  Prusinski et al.
2010/0284824 A1  11/2010  Hippen et al.

FOREIGN PATENT DOCUMENTS

JP    2000130176    5/2000
JP    2007309101    11/2007
(Continued)

*Primary Examiner* — Gregory Anderson
*Assistant Examiner* — Juan G Flores
(74) *Attorney, Agent, or Firm* — Perkins Coie LLP

(57) ABSTRACT

An electrically assisted turbocharger (10) includes an air cooling system for cooling an electric motor (52) housed within a motor chamber (54) in a bearing housing (12). An inlet volute (76) is formed in the bearing housing (12) on a first side of the electric motor (52) and an outlet volute (78) is formed in the bearing housing (12) on a second side of the electric motor (52) opposite from the inlet volute (76). The inlet volute (76) accelerates cooling air that is fed into the inlet volute (76) and directs the cooling air into the motor chamber (54). The cooling air travels in an axial direction through the motor chamber (54) from the inlet volute (76) to the outlet volute (78), thereby cooling the electric motor (52). The outlet volute (78) decelerates the cooling air and directs the cooling air out of the motor chamber (54).

15 Claims, 4 Drawing Sheets

(51) Int. Cl.
*F02C 6/12* (2006.01)
*F04D 17/10* (2006.01)
*F04D 29/40* (2006.01)

(52) U.S. Cl.
CPC ........... *F04D 17/10* (2013.01); *F04D 29/403* (2013.01); *F04D 29/582* (2013.01)

(56) References Cited

FOREIGN PATENT DOCUMENTS

| | | | | |
|---|---|---|---|---|
| JP | 2010196478 | A | * | 9/2010 |
| JP | 2012097610 | | | 5/2012 |

* cited by examiner

SUPPLEMENTAL AIR COOLING SYSTEM AND AIR PRESSURE OIL SEALING SYSTEM FOR ELECTRICAL TURBOCOMPOUND MACHINE

CROSS-REFERENCE TO RELATED APPLICATION

This application claims priority to and all the benefits of U.S. Provisional Application No. 61/725,150, filed on Nov. 12, 2012, and entitled "Supplemental Air Cooling System And Air Pressure Oil Sealing System For Electrical Turbocompound Machine."

BACKGROUND OF THE INVENTION

1. Field of the Invention

This invention relates to an electrical turbocompound machine for an internal combustion engine. More particularly, this invention relates to an air cooling system for cooling an electric motor within a turbocharger.

2. Description of Related Art

A turbocharger is a type of forced induction system used with internal combustion engines. Turbochargers deliver compressed air to an engine intake, allowing more fuel to be combusted, thus boosting an engine's power density without significantly increasing engine weight. Thus, turbochargers permit the use of smaller engines that develop the same amount of power as larger, normally aspirated engines. Using a smaller engine in a vehicle has the desired effect of decreasing the mass of the vehicle, increasing performance, and enhancing fuel economy. Moreover, the use of turbochargers permits more complete combustion of the fuel delivered to the engine, which contributes to the highly desirable goal of reduced emissions.

Turbochargers include a turbine stage having a turbine housing connected to the engine's exhaust manifold, a compressor stage having a compressor housing connected to the engine's intake manifold, and a bearing housing connecting the turbine and compressor housings together. The turbine stage includes a turbine wheel disposed within the turbine housing and the compressor stage includes a compressor impeller disposed within the compressor housing. The turbine wheel is rotatably driven by an inflow of exhaust gas supplied from the exhaust manifold. A shaft is rotatably supported in the bearing housing and couples the turbine wheel to the compressor impeller such that rotation of the turbine wheel causes rotation of the compressor impeller. The shaft connecting the turbine wheel and the compressor impeller defines an axis of rotation. As the compressor impeller rotates, it compresses ambient air entering the compressor housing, thereby increasing the air mass flow rate, airflow density, and air pressure delivered to the engine's cylinders via the engine's intake manifold.

At low engine speeds, exhaust gas is supplied to the turbine wheel at a lower pressure causing the turbine wheel and compressor impeller to rotate slower, resulting in the air entering the compressor housing being compressed less, which results in a so-called "turbo-lag." In order to minimize turbo-lag and improve turbocharger efficiency, and therefore engine efficiency, it is known to incorporate an electric motor into the turbocharger. This type of turbocharger is commonly referred to as an electrical turbocompound machine or electrically assisted turbocharger. The electric motor is energized at low engine speeds to impart additional torque to the shaft of the turbocharger, which causes the turbine wheel and compressor impeller to rotate faster, increasing the air mass flow rate delivered to the engine than would otherwise be delivered by a non-electrically assisted turbocharger. The electric motor can also be used as a generator, which converts shaft work, i.e., rotation of the shaft, into electrical power. The electrical power produced by the generator can be used to run auxiliary electrical components or to augment engine power.

One example of an electric motor that is incorporated into the turbocharger is a switched reluctance motor (SRM). The principles of operation of SRMs are simple, well known, and based on reluctance torque. SRMs have a stator with concentrated windings and a rotor with no winding. In a typical electrically assisted turbocharger, the SRM is located in a motor chamber defined within the bearing housing. The rotor is integrated with or mounted on the shaft and is positioned generally between a set of shaft bearings. The stator is fixedly secured and surrounds the rotor. A typical SRM may have six stator poles and four rotor poles, denoted as a "6/4 SRM." The 6/4 SRM has three phases, each phase consisting of two windings on opposite stator poles. The windings in one phase are simultaneously energized and generate a magnetic flux. The magnetic flux created by the windings follows the path of least magnetic reluctance, meaning the flux will flow through the rotor poles that are closest to the energized stator poles, thereby magnetizing those rotor poles and causing the rotor to align itself with the energized stator poles. Electromagnetic torque is produced by the tendency of the rotor poles to align with the energized stator poles. As the rotor turns, different phases will be sequentially energized to keep the rotor turning. For use as a generator, the phases are energized when the stator poles and rotor poles are separating, rather than when they are approaching.

A liquid cooling system is typically provided as a primary means of minimizing heat transfer from the exhaust gas in the turbine stage to the electric motor in the bearing housing. However, under certain operating conditions, it is recognized that the liquid cooling system may not adequately cool the electric motor. As such, it is desirable to supplement the liquid cooling system with an air cooling system.

Air cooling systems for electrically assisted turbochargers are generally well known. For example, U.S. Pat. No. 5,605,045 discloses an electrically assisted turbocharger 10 including a shaft 16 having a turbine wheel 20 mounted on one end and a compressor impeller 28 mounted on the opposite end. The turbocharger 10 also includes an electric motor 56 housed within a bearing housing 30. An annular oil passage 38 in the bearing housing 30 is directly outside the electric motor 56 and it is the flow of oil through the annular oil passage 38 which removes most of the heat which gets into the bearing housing 30. An air cooling system includes an air passage 90' through the center of the shaft 16 and an air pump 94 that delivers air through the air passage 90' to move heat out of the shaft 16 in a direction opposite the direction in which heat is soaking into the shaft 16 from a turbine inlet scroll 18.

Similarly, U.S. Pat. No. 6,609,375 discloses an electrically assisted turbocharger 10 including a compressor 16, a turbine 18, and a motor housing 20 therebetween. The turbocharger 10 also includes an electric motor having a stator 42 and rotor 44 which are housed within the motor housing 20. An air cooling system includes a first cooling hose 34 which directs pressurized air from the compressor 16 into the motor housing 20 through an airflow inlet 40. The air travels in a radial direction across the stator 42 and rotor 44, through the motor housing 20, and out an airflow outlet 46 located on an opposite circumferential side of the motor housing 20 from the airflow inlet 40. A second cooling hose 36 directs the air back to an inlet of the compressor 16.

Known air cooling systems art are not optimal in terms of the ability to supplement a liquid cooling system in an electrically assisted turbocharger. It is desirable, therefore, to provide an air cooling system which effectively supplements a liquid cooling system in an electrically assisted turbocharger.

SUMMARY OF THE INVENTION

According to one aspect of the invention, an electrically assisted turbocharger includes an air cooling system for cooling an electric motor with cooling air. The turbocharger includes a bearing housing having a motor chamber for housing the electric motor. The air cooling system includes an inlet volute that is formed in the bearing housing and is disposed on a first side of the electric motor and an outlet volute that is formed in the bearing housing and is disposed on a second side of the electric motor opposite from the inlet volute. The inlet volute accelerates the cooling air that is fed into the inlet volute and directs the cooling air into the motor chamber. The cooling air travels in an axial direction through the motor chamber from the inlet volute to the outlet volute to cool the electric motor. The outlet volute decelerates the cooling air and directs the cooling air out of the motor chamber.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

Figure 1:
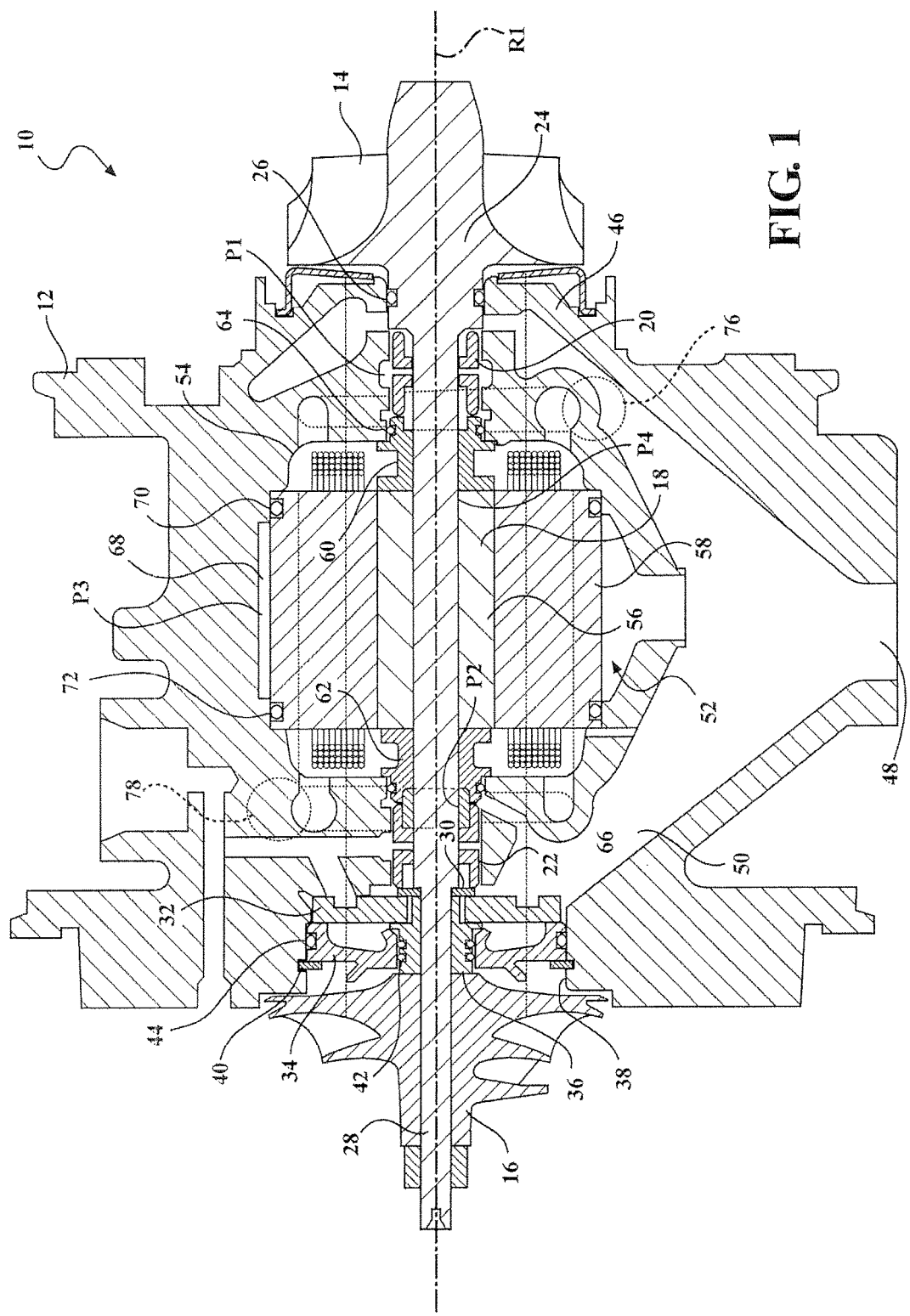
FIG. 1 is a cross-sectional view of an electrically assisted turbocharger including an air cooling system according to one embodiment of the invention.
Figure 3:
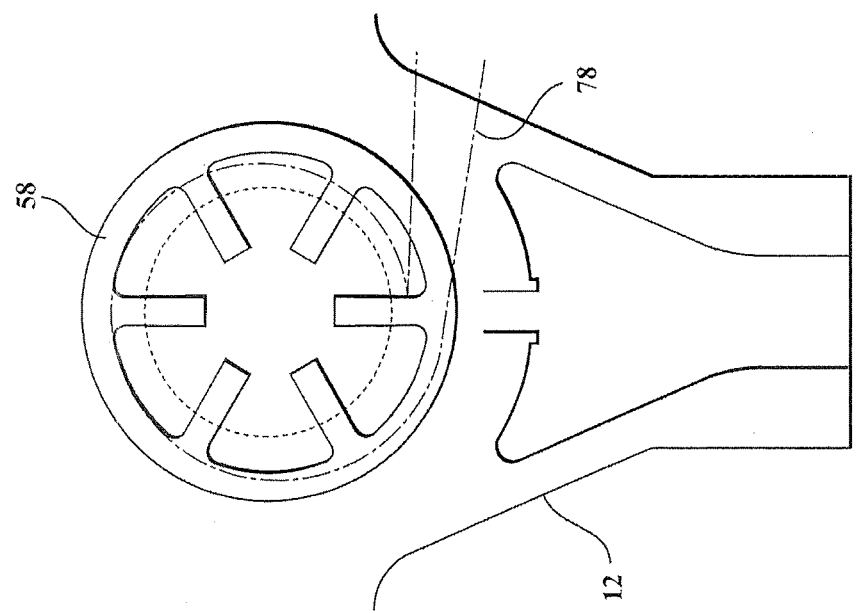
FIG. 3 is a cross-sectional side view of the bearing housing illustrating an outlet volute of the air cooling system.
Figure 2:
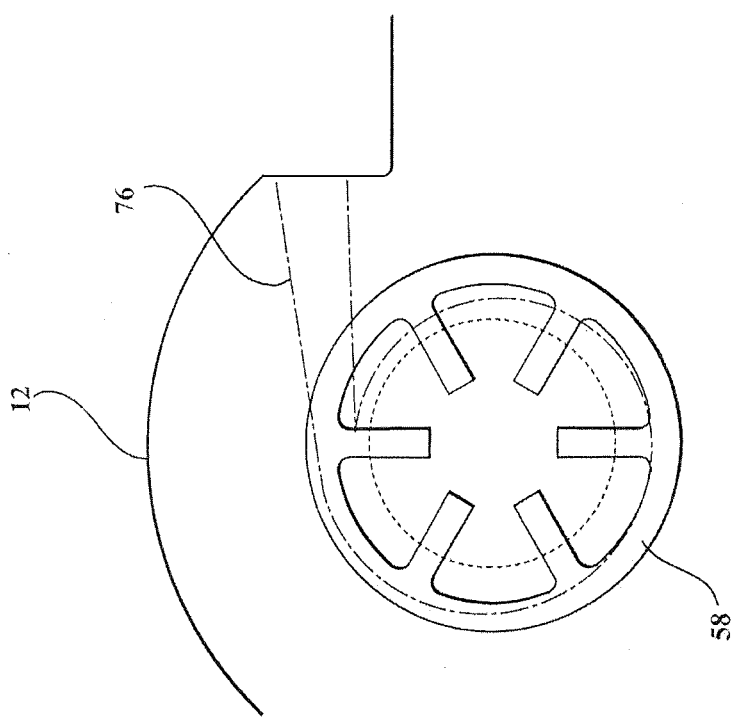
FIG. 2 is a cross-sectional side view of a bearing housing illustrating an inlet volute of the air cooling system.
Figure 4:
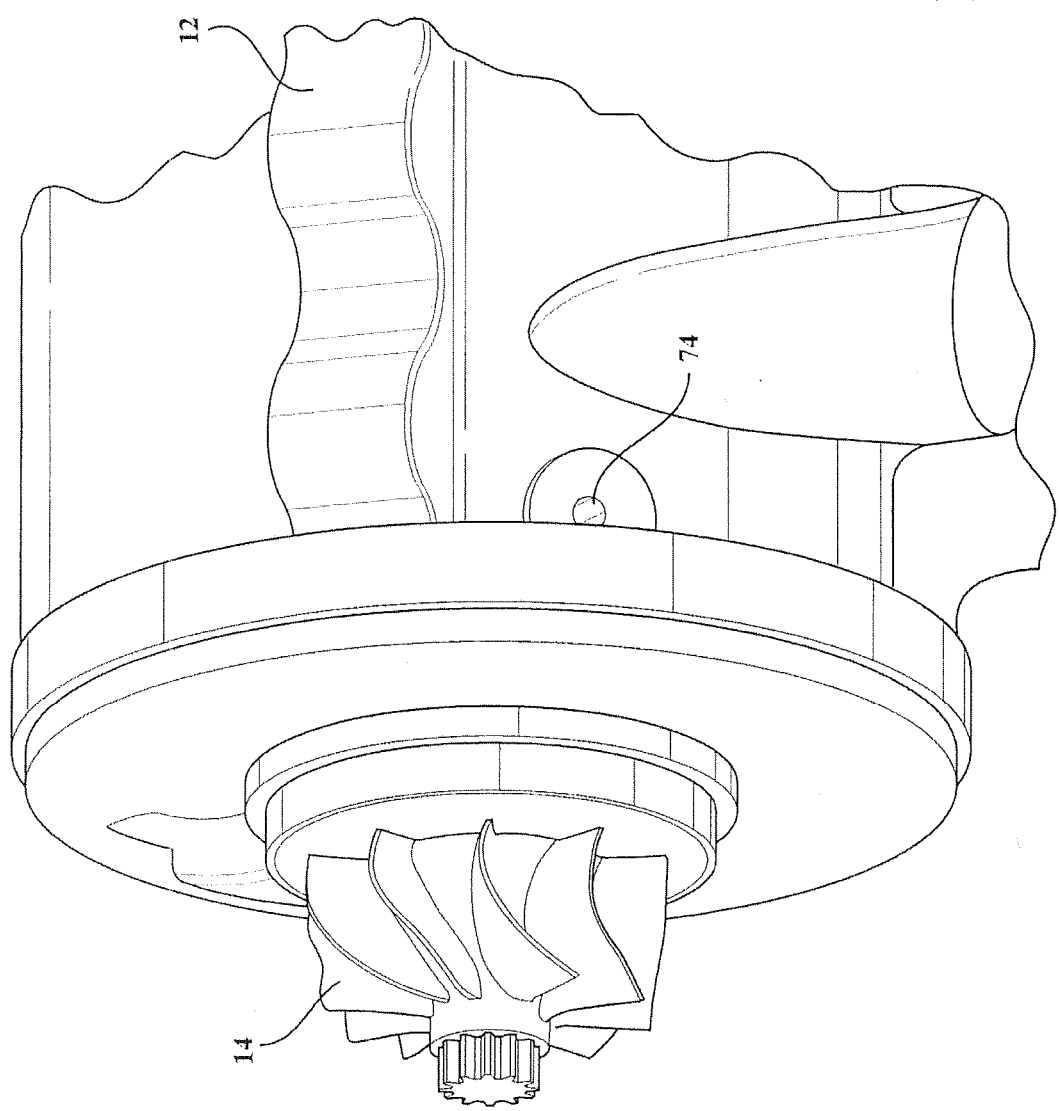
FIG. 4 is a fragmentary, perspective view of a bearing housing illustrating an air inlet bore.

Referring to the Figures, a portion of a turbocharger is illustrated generally at 10 in FIG. 1. The turbocharger 10 includes a bearing housing 12 coupled between a turbine stage and a compressor stage. The turbine stage includes a turbine wheel 14 disposed within a turbine housing (not shown) and the compressor stage includes a compressor impeller 16 disposed within a compressor housing (not shown). The turbine wheel 14 is rotatably driven by an inflow of exhaust gas supplied from an engine exhaust manifold. After driving the turbine wheel 14, the exhaust gas is discharged from the turbine housing through a central exit pipe or exducer. A shaft 18 is rotatably supported in the bearing housing 12 and connects the turbine wheel 14 to the compressor impeller 16 such that rotation of the turbine wheel 14 causes rotation of the compressor impeller 16. The shaft 18 connecting the turbine wheel 14 and the compressor impeller 16 defines an axis of rotation R1. As the compressor impeller 16 rotates, air is drawn into the compressor housing through an inlet passage and is compressed to be delivered at an elevated pressure to an engine intake manifold.

The shaft 18 is rotatably supported in the bearing housing 12 by first and second journal bearings 20, 22 that are spaced apart in an axial direction. The turbine wheel 14 is typically butt welded to one end of the shaft 18 directly adjacent to an enlarged shoulder portion 24 of the shaft 18. The shaft 18 extends through a turbine side of the bearing housing 12. A first piston ring 26 encircles an outer circumference of the shoulder portion 24 to form a seal between the shaft 18 and the bearing housing 12 to prevent the exhaust gas in the turbine stage from entering the bearing housing 12.

An opposite end of the shaft 18 has a reduced diameter portion 28 on which the compressor impeller 16 is mounted. Adjacent to the second journal bearing 22, the reduced diameter portion 28 of the shaft 18 carries a thrust washer 30 that cooperates with a stationary thrust bearing member 32 to handle axial loads in the turbocharger 10. The reduced diameter portion 28 also carries an insert 34 and a flinger sleeve 36 that are located directly adjacent to a backside of the compressor impeller 16. The thrust washer 30, thrust bearing member 32, insert 34, and flinger sleeve 36 are assembled into a thrust bearing pocket 38 on a compressor side of the bearing housing 12. A snap ring 40 retains the thrust washer 30, thrust bearing member 32, insert 34, and flinger sleeve 36 in the thrust bearing pocket 38. The insert 34 and flinger sleeve 36 cooperate to prevent oil from being sucked into the compressor housing and to keep the compressed air from leaking into the bearing housing 12. The flinger sleeve 36 is mounted on and rotates with the shaft 18. The shaft 18 with the flinger sleeve 36 extends through the insert 34. A second piston ring 42 encircles an outer circumference of the flinger sleeve 36 to form a seal between the flinger sleeve 36 and the insert 34 to prevent the compressed air in the compressor stage from entering the bearing housing 12. An O-ring 44 encircles an outer circumference of the insert 34 to form a seal between the insert 34 and the bearing housing 12, which also prevents the compressed air in the compressor stage from entering the bearing housing 12.

Oil circulates through the bearing housing 12 to provide lubrication to the first and second journal bearings 20, 22. On the turbine side, as the shaft 18 rotates, oil leaving the first journal bearing 20 is picked up by the shoulder portion 24 and is directed outwardly toward a first oil drain 46 which leads to an oil drain cavity 48. On the compressor side, as the shaft 18 rotates, oil leaving the second journal bearing 22 is picked up by the flinger sleeve 36 and is directed outwardly toward a second oil drain 50 which leads to the oil drain cavity 48.

An electric motor, generally shown at 52, is incorporated into the turbocharger 10. In one example, the motor may be a switched reluctance motor (SRM). The electric motor 52 is disposed in a motor chamber 54 defined within the bearing housing 12 and is positioned in the axial direction between the first and second journal bearings 20, 22. The electric motor 52 includes a rotor 56 and a stator 58. The rotor 56 is mounted on the shaft 18 and rotates therewith. The rotor 56 extends in the axial direction between first and second collars 60, 62, which are fixed to the shaft 18. The first and second collars 60, 62 assist to transmit torque from the rotor 56 to the shaft 18 if the electric motor 52 is operating as a motor and to transmit torque from the shaft 18 to the rotor 56 if the electric motor 52 is operating as a generator. The first and second collars 60, 62 also act as spacers between the rotor 56 and the first and second journal bearings 20, 22, respectively. The stator 58, having concentrated windings on each pole, is mounted in a stationary manner and surrounds the rotor 56 circumferentially.

A third piston ring 64 encircles an outer circumference of the first collar 60 to form a seal between the first collar 60 and the bearing housing 12 to prevent oil used to lubricate the first journal bearing 20 from leaking into the motor chamber 54. Similarly, a fourth piston ring 66 encircles an outer circumference of the second collar 62 to form a seal between the second collar 62 and the bearing housing 12 to prevent oil used to lubricate the second journal bearing 22 from leaking into the motor chamber 54.

A liquid cooling system is provided to minimize heat transfer from the exhaust gas in the turbine stage to the electric motor 52 in the bearing housing 12. The liquid cooling system includes an annular liquid cooling cavity 68 defined between an outer circumference of the stator 58 and an inner circumference of the bearing housing 12. The liquid cooling cavity 68 extends in the axial direction between first and second O-rings 70, 72 that encircle the outer circumference of the stator 58 to form a seal between the stator 58 and the bearing housing 12. Oil circulates through the liquid cooling cavity 68 to remove heat that emanates from the turbine stage, thereby cooling the electric motor 52. The first and second O-rings 70, 72 seal the liquid cooling cavity 68 to prevent oil in the liquid cooling cavity 68 from leaking into the motor chamber 54.

An air cooling system is provided to supplement the liquid cooling system. The air cooling system includes an air inlet bore 74 which extends through the wall of the bearing housing 12 and is coupled with an inlet volute 76 formed in the turbine side of the bearing housing 12. The inlet volute 76 is open to an inlet end of the motor chamber 54 in the axial direction. The inlet volute 76 has a scroll shape for accelerating a flow of cooling air. An outlet volute 78 is formed in the compressor side of the bearing housing 12 on a side of the electric motor 52 opposite the inlet volute 76. The outlet volute 78 is open to an outlet end of the motor chamber 54 in the axial direction. The outlet volute 78 has a scroll shape opposite to that of the inlet volute 76 for decelerating a flow of cooling air. The outlet volute 78 is coupled to an air outlet bore (not shown) which extends through the wall of the bearing housing 12.

Cooling air from the compressor stage of the turbocharger 10 flows through an inlet hose or similar conduit coupled to the air inlet bore 74 and is fed into the inlet volute 76. The cooling air accelerates in the inlet volute 76 and transitions from tangential flow in the inlet volute 76 to axial flow in the motor chamber 54. The cooling air flows through the motor chamber 54 in the axial direction, thereby cooling the rotor 56 and stator 58 of the electric motor 52. When the cooling air reaches the opposite end of the motor chamber 54, the cooling air transitions from axial flow in the motor chamber 54 to tangential flow in the outlet volute 78. The cooling air decelerates in the outlet volute 78 and then exits the outlet volute 78 through the air outlet bore. An outlet hose or similar conduit coupled to the air outlet bore directs the cooling air back to the compressor stage of the turbocharger 10.

In the embodiment described above, the cooling air enters the motor chamber 54 on the turbine side of the bearing housing 12 and exits the motor chamber 54 on the compressor side of the bearing housing 12. It is appreciated that the inlet and outlet volutes 76, 78, as well as the air inlet bore 74 and air outlet bore may be arranged such that the cooling air flows in the opposite direction, without varying from the scope of the invention. For example, the cooling air may enter the motor chamber 54 on the compressor side of the bearing housing 12 and exit the motor chamber 54 on the turbine side of the bearing housing 12.

Under operating conditions, a first pressure P1 is established in the bearing housing 12 in an area defined between the first piston ring 26 and the third piston ring 64, a second pressure P2 is established in the bearing housing 12 in an area defined between the second piston ring 42 and the fourth piston ring 66, a third pressure P3 is established in the liquid cooling cavity 68, and a fourth pressure P4 is established in the motor chamber 54. It is understood that the first pressure P1 may have a tendency to cause oil used to lubricate the first journal bearing 20 to leak past the third piston ring 64 into the motor chamber 54. Similarly, it is understood that the second pressure P2 may have a tendency to cause oil used to lubricate the second journal bearing 22 to leak past the fourth piston ring 66 into the motor chamber 54. Likewise, it is understood that the third pressure P3 may have a tendency to cause oil in the liquid cooling cavity 68 to leak past the first and second O-rings 70, 72 into the motor chamber 54. Introducing the cooling air into the motor chamber 54, in the manner described above, increases the fourth pressure P4 such that a delta between the first pressure P1 and the fourth pressure P4 is lowered, thereby minimizing the tendency of oil to leak past the third piston ring 64 into the motor chamber 54. Similarly, a delta between the second pressure P2 and the fourth pressure P4 is lowered, thereby minimizing the tendency of oil to leak past the fourth piston ring 66 into the motor chamber 54. Likewise, a delta between the third pressure P3 and the fourth pressure P4 is lowered, thereby minimizing the tendency of oil to leak past the first and second O-rings 70, 72 into the motor chamber 54.

Figure 5:
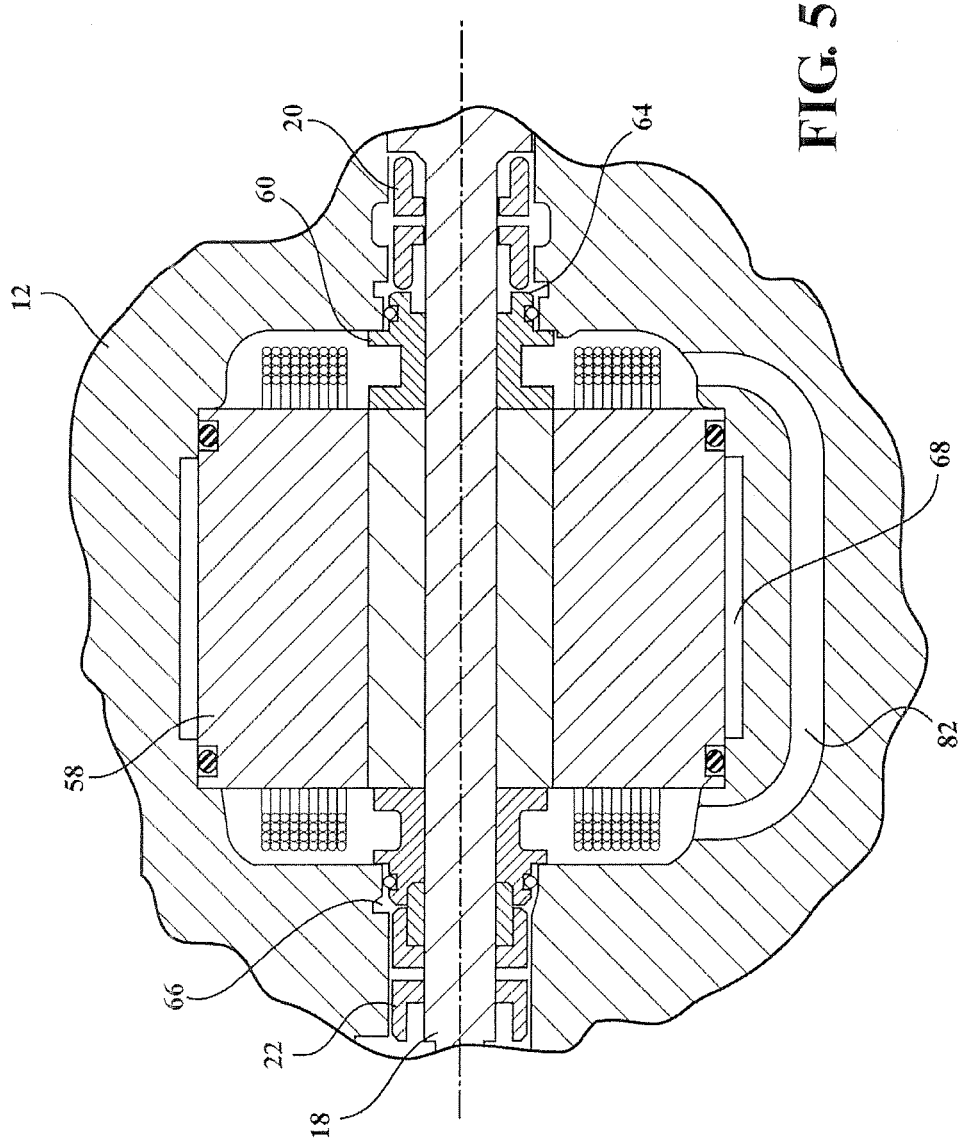
FIG. 5 is a cross-sectional view of the bearing housing including an air channel according to another embodiment of the invention.

In a second embodiment of the invention, shown generally in FIG. 5, the bearing housing 12 includes an air channel 82 coupled between opposite ends of the motor chamber 54 for balancing the pressure within the motor chamber 54. More specifically, the air channel 82 is a passage extending within the bearing housing 12 that is separate and apart from the motor chamber 54. One end of the air channel 82 is coupled to the inlet end of the motor chamber 54 adjacent to the inlet volute 76 and another end of the air channel 82 is coupled to the outlet end of the motor chamber 54 adjacent to the outlet volute 78. It is appreciated that the air channel 82 will balance the pressure between the inlet and outlet ends of the motor chamber 54. Balancing the pressure between the inlet and outlet ends of the motor chamber 54, balances the pressure on the first and second O-rings 70, 72, which helps to seal the liquid cooling cavity 68. The air channel 82 extends through the bearing housing 12 and is routed on an outboard side of the liquid cooling cavity 68.

The invention has been described here in an illustrative manner, and it is to be understood that the terminology used is intended to be in the nature of words of description rather than limitation. Many modifications and variations of the present invention are possible in light of the above teachings. It is, therefore, to be understood that within the scope of the appended claims, the invention may be practiced other than as specifically enumerated within the description.

What is claimed:

1. A turbocharger (10) including an air cooling system for cooling an electric motor (52) with cooling air, said turbocharger (10) comprising:
   a bearing housing (12) including a motor chamber (54) for housing the electric motor (52);

an inlet volute (76) formed in said bearing housing (12) and disposed on a first side of the electric motor (52), wherein said inlet volute (76) accelerates the cooling air that is fed into said inlet volute (76) and directs the cooling air into said motor chamber (54); and an outlet volute (78) formed in said bearing housing (12) and disposed on a second side of the electric motor (52) opposite from said inlet volute (76), wherein said inlet volute (76) and said outlet volute (78) are spaced apart in an axial direction, and wherein said outlet volute (78) decelerates the cooling air and directs the cooling air out of said motor chamber (54);

wherein the cooling air travels in said axial direction through said motor chamber (54) from said inlet volute (76) to said outlet volute (78) thereby cooling the electric motor (52).

2. The turbocharger (10) as set forth in claim 1 wherein said inlet volute (76) accelerates the cooling air in a tangential direction relative to said axial direction.

3. The turbocharger (10) as set forth in claim 2 wherein said outlet volute (78) decelerates the cooling air in said tangential direction relative to said axial direction.

4. The turbocharger (10) as set forth in claim 3 including an air inlet bore (74) and an air outlet bore, said air inlet bore (74) extending through a wall of said bearing housing (12) and coupled to said inlet volute (76), wherein the cooling air enters said inlet volute (76) through said air inlet bore (74), said air outlet bore extending through said wall of said bearing housing (12) and coupled to said outlet volute (78), wherein the cooling air exits said outlet volute (78) through said air outlet bore.

5. The turbocharger (10) as set forth in claim 1 wherein said bearing housing (12) includes an air channel (82) separate and apart from said motor chamber (54), said air channel (82) is coupled between an inlet end of said motor chamber (54) adjacent said inlet volute (76) and an outlet end of said motor chamber (54) adjacent said outlet volute (78).

6. A bearing housing (12) including a liquid cooling system and an air cooling system for cooling an electric motor (52) of an electrically assisted turbocharger (10), said bearing housing (12) comprising:

a motor chamber (54) for housing the electric motor (52);

an annular liquid cooling cavity (68) defined between an outer circumference of the electric motor (52) and an inner circumference of the bearing housing (12);

an inlet volute (76) formed in said bearing housing (12) and disposed on a first side of the electric motor (52), wherein said inlet volute (76) accelerates the cooling air that is fed into said inlet volute (76) and directs the cooling air into said motor chamber (54); and an outlet volute (78) formed in said bearing housing (12) and disposed on a second side of the electric motor (52) opposite from said inlet volute (76), wherein said inlet volute (76) and said outlet volute (78) are spaced apart in an axial direction, and wherein said outlet volute (78) decelerates the cooling air and directs the cooling air out of said motor chamber (54);

wherein the cooling air travels in said axial direction through said motor chamber (54) from said inlet volute (76) to said outlet volute (78) thereby cooling the electric motor (52).

7. The bearing housing (12) as set forth in claim 6 wherein said inlet volute (76) accelerates the cooling air in a tangential direction relative to said axial direction.

8. The bearing housing (12) as set forth in claim 7 wherein said outlet volute (78) decelerates the cooling air in said tangential direction relative to said axial direction.

9. The bearing housing (12) as set forth in claim 8 including an air inlet bore (74) and an air outlet bore, said air inlet bore (74) extending through a wall of said bearing housing (12) and coupled to said inlet volute (76), wherein the cooling air enters said inlet volute (76) through said air inlet bore (74), said air outlet bore extending through said wall of said bearing housing (12) and coupled to said outlet volute (78), wherein the cooling air exits said outlet volute (78) through said air outlet bore.

10. A turbocharger (10) comprising:

a bearing housing (12) including a motor chamber (54);

an electric motor (52) disposed within said motor chamber (54);

a liquid cooling system for cooling said electric motor (52) with a liquid; and an air cooling system for cooling said electric motor (52) with cooling air to supplement said liquid cooling system;

wherein the cooling air travels in said axial direction through said motor chamber (54) from said inlet volute (76) to said outlet volute (78) thereby cooling said electric motor (52).

11. The turbocharger (10) as set forth in claim 10 wherein said liquid cooling system includes an annular liquid cooling cavity (68) disposed between an outer circumference of said electric motor (52) and an inner circumference of said bearing housing (12).

12. The turbocharger (10) as set forth in claim 11 wherein said air cooling system includes an inlet volute (76) formed in said bearing housing (12) and an outlet volute (78) formed in said bearing housing (12), said inlet volute (76) and said outlet volute (78) spaced apart in an axial direction, and wherein said inlet volute (76) accelerates the cooling air that is fed into said inlet volute (76) and directs the cooling air into said motor chamber (54), and wherein said outlet volute (78) decelerates the cooling air and directs the cooling air out of said motor chamber (54).

13. The turbocharger (10) as set forth in claim 12 wherein said inlet volute (76) is disposed on a first side of said electric motor (52) and said outlet volute (78) is disposed on a second side of said electric motor (52) opposite from said inlet volute (76).

14. The turbocharger (10) as set forth in claim 13 wherein said liquid cooling cavity (68) extends in said axial direction between first and second O-rings (70, 72), said first and second O-rings (70, 72) encircle an outer circumference of said electric motor (52) and contact an inner circumference of said bearing housing (12) to form a seal therebeween.

15. The turbocharger (10) as set forth in claim 14 wherein said bearing housing (12) includes an air channel (82) separate and apart from said motor chamber (54), said air channel (82) is coupled between an inlet end of said motor chamber (54) adjacent said inlet volute (76) and an outlet end of said motor chamber (54) adjacent said outlet volute (78) to balance a pressure within said motor chamber (54).

* * * * *